(12) United States Patent
Chen

(10) Patent No.: US 8,632,009 B2
(45) Date of Patent: Jan. 21, 2014

(54) NEAR FIELD MAGNETIC COUPLING ANTENNA AND RFID READER HAVING THE SAME

(75) Inventor: Chun-Hua Chen, New Taipei (TW)

(73) Assignee: Auden Techno Corp., Taoyuan County (TW)

(*) Notice: Subject to any disclaimer, the term of this patent is extended or adjusted under 35 U.S.C. 154(b) by 0 days.

(21) Appl. No.: 13/473,697

(22) Filed: May 17, 2012

(65) Prior Publication Data
US 2013/0306725 A1   Nov. 21, 2013

(51) Int. Cl.
*G06K 7/00* (2006.01)

(52) U.S. Cl.
USPC .... 235/439; 343/722; 343/786; 343/700 MS; 343/829; 340/572.7

(58) Field of Classification Search
USPC ........... 235/439; 343/722, 786, 700 MS, 829; 340/572.7
See application file for complete search history.

(56) References Cited

U.S. PATENT DOCUMENTS

| | | | |
|---|---|---|---|
| 3,918,063 A * | 11/1975 | Nakamichi et al. | 343/722 |
| 5,959,591 A * | 9/1999 | Aurand | 343/786 |
| 6,870,507 B2 * | 3/2005 | Anguera Pros et al. | 343/700 MS |
| 2005/0062670 A1 * | 3/2005 | Suh et al. | 343/829 |
| 2008/0238683 A1 * | 10/2008 | Burns et al. | 340/572.7 |

* cited by examiner

*Primary Examiner* — Seung Lee
*Assistant Examiner* — Asifa Habib
(74) *Attorney, Agent, or Firm* — Li & Cai Intellectual Property (USA) Office

(57) ABSTRACT

A near field magnetic coupling antenna may include a plurality of annularly arranged radiators and an annular conductive portion. The annular conductive portion may include a plurality of conductive segments. A first gap may be formed between any two adjacent radiators. Each conductive segment may partially overlap two adjacent radiators and any two adjacent conductive segments may be separated by a second gap. Two adjacent radiators may be associated with a feed point and a ground point, respectively, and the feed point and the ground point may be disposed in the proximity of the first gap.

14 Claims, 6 Drawing Sheets

NEAR FIELD MAGNETIC COUPLING ANTENNA AND RFID READER HAVING THE SAME

BACKGROUND OF THE INVENTION

1. Field of the Invention

The instant disclosure relates to an antenna; in particular, to a near field magnetic coupling antenna and a RFID (Radio Frequency Identification) reader having the same near field magnetic coupling antenna.

2. Description of Related Art

Radio frequency identification is a wireless communication technology which utilizes a reader and a tag to constitute a RFID system. The RFID reader transmits radio waves, and the RFID tag generates electric current according to electromagnetic induction of the radio waves. The generated electric current is for the operation of the chip (or integrated circuit) in the RFID tag and the RFID tag transmits electromagnetic wave responding to the RFID reader.

The operation bands of existing RFID technology is usually the ultra high frequency (UHF) band. The UHF band which is widely used in wireless communications ranges from 300 MHz to 3 GHz. The RFID technology utilizing the UHF band enables the RFID reader to identify a RFID tag located within 10 centimeter from the RFID reader.

The antenna of the traditional RFID reader is usually a loop antenna. The loop antenna is simpler in structure and smaller in volume, with the manufacturing cost of the loop antenna relatively low. However, the magnetic field generated by the traditional loop antenna is not so uniform. And because of the loop structure of the traditional loop antenna the magnitude of the electromagnetic field (or magnetic field) may be insufficient.

SUMMARY OF THE INVENTION

The object of the instant disclosure is to offer a near field magnetic coupling antenna and a RFID reader having the same, resulting in a more uniform near-field magnetic field and an enhanced near-field magnetic field in magnitude.

In order to achieve the aforementioned objects, according to an embodiment of the instant disclosure, the near field magnetic coupling antenna may include a plurality of annularly arranged radiators and an annular conductive portion. The annular conductive portion may include a plurality of conductive segments. A first gap may be formed between any two adjacent radiators. Each conductive segment may partially overlap two adjacent radiators and any two adjacent conductive segments may be separated by a second gap. Each of the two adjacent radiators may be associated with a feed point and a ground point, respectively, and the feed point and the ground point may be disposed in the proximity of the first gap.

In order to achieve the aforementioned objects, according to an embodiment of the instant disclosure, a RFID reader is offered. The RFID reader may include a RFID chip, a coaxial cable and a near field magnetic coupling antenna. The coaxial cable may include an inner conductor and a ground conductor coupling the RFID chip. The near field magnetic coupling antenna may include a plurality of annularly arranged radiators and an annular conductive portion. The annular conductive portion may include a plurality of conductive segments. A first gap may be formed between any two of the adjacent radiators. Each conductive segment may partially overlap two adjacent radiators and any two of the adjacent conductive segments may be separated by a second gap. Each of the two adjacent radiators of the plurality of radiators may be associated with a feed point and a ground point, respectively, and the feed point and the ground point may be disposed in the proximity of the first gap. The feed point is coupled to the inner conductor of the coaxial cable, and the ground point is coupled to the ground conductor of the coaxial cable.

In summary, the near field magnetic coupling antenna and the RFID reader offered by embodiments of the instant disclosure have resonant frequency and bandwidth adapted for the radio frequency identification. The near-field magnetic field is more uniform, and the magnitude of the near-field magnetic field could be enhanced.

In order to further the understanding regarding the instant disclosure, the following embodiments are provided along with illustrations to facilitate the disclosure of the instant disclosure.

DETAILED DESCRIPTION OF THE PREFERRED EMBODIMENTS

Figure 1A:
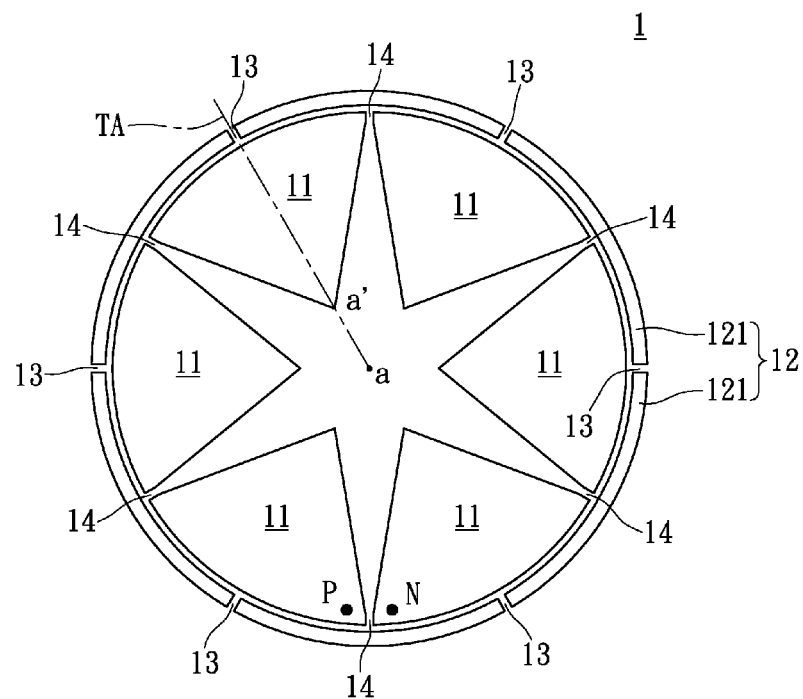
FIG. 1A shows a schematic diagram of a near field magnetic coupling antenna according to an embodiment of the instant disclosure.

The aforementioned illustrations and following detailed descriptions are exemplary for the purpose of further explaining the scope of the instant disclosure. Other objectives and advantages related to the instant disclosure will be illustrated in the subsequent descriptions and appended drawings.

FIG. 1 shows a schematic diagram of a near field magnetic coupling antenna 1 according to an embodiment of the instant disclosure. The near field magnetic coupling antenna 1 may include a plurality of annularly arranged radiators 11 and an annular conductive portion 12. The annular conductive portion 12 may include a plurality of conductive segments 121. The radiators 11 and the annular conductive portion 12 may be placed on a substrate (not shown in the figure). And in one implementation the substrate may be a printed circuit board. The pattern of the radiators 11 and the annular conductive portion 12 may be made on the substrate through an etching process.

The radiators 11 are arranged in a predetermined manner so that a star shape-cavity where no radiators 11 are present could be defined, and a gap 14 is formed between any two adjacent radiators 11. The annular conductive portion 12 may further surround the annularly arranged radiators 11. Each conductive segment 121 of the annular conductive portion 12 may partially overlap two adjacent radiators 11, and any two adjacent conductive segments 121 may be separated by a gap 13. In one implementation, the radiators 11 may be arranged by having a disk-shaped conductive plate evenly split at predetermined locations (e.g., outward vertices of the star-shaped cavity). And the adjacent conductive segments 121 may be separated from each other at the equally-partitioned points. In other words, the positions of the gaps 13 may be at the above-mentioned equally-partitioned points, and in order to form the conductive segments 121 the annularly arranged conductive portion 12 may be cut at the equally-partitioned points. Further, it is worth noting that the number of the outward vertices of the star-shape cavity may be the same as the number of the equally-partitioned points. Thus, the number of the radiators 11 and the number of the conductive segments 121 of the annular conductive portion 12 may be the same. Two adjacent radiators 11 may be associated with a feed point P and a ground point N, respectively, and the feed point P and the ground point N may be disposed in the proximity of the gap 14 between the two adjacent radiators 11.

The feed point P and the ground point N may be adapted for the receipt of a UHF (Ultra High Frequency) signal, such as a UHF signal at 900 MHz. The increased area of the radiators 11 may offer more space for the surface current of the antenna so as to enhance the magnitude of the near-field magnetic field. The gaps 14 between the annularly arranged radiators 11 may allow for the two adjacent annularly arranged radiators 11 to be inductively coupled together. The UHF signal is feed into the two adjacent radiators 11 through the feed point P and the ground point N, thus the two adjacent radiators 11 could operate in a resonant mode at a resonant frequency at 900 MHz. Additionally, the magnetic coupling between the annularly arranged radiators 11 may enable the UHF signal be coupled to the adjacent radiators 11, exciting the resonant modes associated with similar wavelengths. It is worth mentioning that the annularly arranged radiators 11 are not restricted to be arranged annularly, when the radiators 11 may be arranged in an ellipse.

As shown in FIG. 1A, each of the radiators 11 has a vertex "a'" facing the center "a" of the disk-shaped conductive plate. Thus, the vertex "a'" may be considered as the inward vertex of the star-shape cavity, while each of the equally-partitioned points may be located at a predetermined position that is in the horizontal alignment with the center "a" of the disk-shaped conductive plate and the vertex "a'" of the corresponding radiator 11 facing the center "a" of the disk-shaped conductive plate (or in other words, the equally-partitioned point, the center of the disk-shaped conductive plate, and the vertex of the radiator 11 may be on the same line TA as shown in FIG. 1A). The conductive segments 121 may be substantially equal in their length. In other words, the annular conductive portion 12 may be evenly divided at the equally-partitioned points. Under this arrangement, the near field magnetic coupling antenna 1 shown in FIG. 1 is symmetry structure, leading to a more uniform magnetic field. However, the instant disclosure is not restricted thereto. Each equally-partitioned point may not at the extension line TA and the positions of the equally-partitioned points may be deviated from the extension line TA with an angle relative to the center "a."

The conductive segments 121 of the annular conductive portion 12 and the radiators 11 may establish capacitive couplings. Besides the vertical magnetic field generated by the near field magnetic coupling antenna 1, an additional magnetic field in transverse distribution may be generated as the result of a reverse current. Thus, the near field magnetic coupling antenna 1 may receive signals from a RFID tag regardless of whether the RFID tag is parallel or perpendicular to the near field magnetic coupling antenna 1. The conductive segments 121 and the radiators 11 may cause the near-field magnetic field to be more uniform and enhance the magnitude of the near-field magnetic field.

Figure 1B:
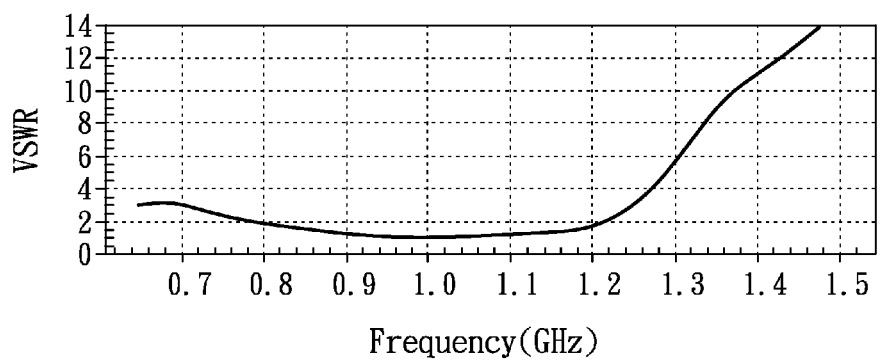
FIG. 1B shows a curve diagram of the VSWR varies with frequency for a near field magnetic coupling antenna according to an embodiment of the instant disclosure.

Please refer to FIG. 1A and FIG. 1B, FIG. 1B shows a curve diagram of the VSWR (Voltage Standing Wave Ratio) that varies with a frequency for a near field magnetic coupling antenna according to an embodiment of the instant disclosure. Taking the resonant frequency at 900 MHz for example, the gap 14 between any two adjacent radiator 11 may be 1 mm to 5 mm, the diameter of the annular conductive portion 12 may be 170 mm to 180 mm, and the distance between the conductive segments 12 of the annular conductive portion 12 and the radiators 11 may be 1 mm to 5 mm. Additionally, for adjusting the impedance match, the distance between the vertex "a'" and the center "a" may range from 20 mm to 30 mm. For example, when the diameter of the annular conductive portion 12 is 175 mm, the distance between the annular conductive portion 12 and the radiators 11 is 2 mm, the width of the conductive segments 121 is 4 mm, the distance between the vertex "a'", and the center "a" is 25 mm, and the gap 14 is 2 mm, with the range of the VSWR that is less than 2 between 800 MHz to 1.2 GHz. Therefore, the near field magnetic coupling antenna 1 according to the instant disclosure may be associated with a relatively wider bandwidth.

Figure 1C:
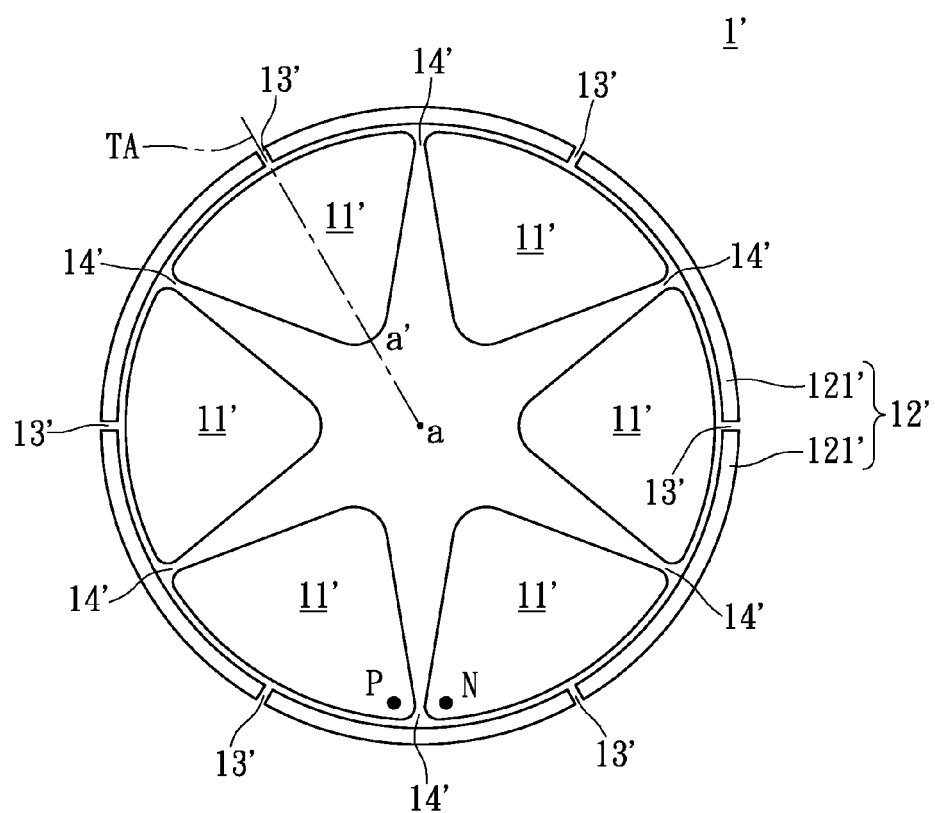
FIG. 1C shows a schematic diagram of a near field magnetic coupling antenna according to an embodiment of the instant disclosure.

Please refer to FIG. 1A and FIG. 1C, FIG. 1C shows a schematic diagram of a near field magnetic coupling antenna according to an embodiment of the instant disclosure. The near field magnetic coupling antenna 1' may include a plurality of annularly arranged radiators 11' and an annular conductive portion 12'. The annular conductive portion 12' may be having a plurality of conductive segments 121' separated by gaps 13'. Each of two adjacent radiators 11' may be associated with a feed point P and a ground point N, respectively, and the feed point P and the ground point N may be disposed in the proximity of the gap 14' between the two adjacent radiators 11'.

Comparing to the near field magnetic coupling antenna 1 shown in FIG. 1A, the near field magnetic coupling antenna 1' shown in FIG. 1C may be associated with the radiators 11' different in shape, which may result in the cavity defined by the radiators 11' that is different in shape compared with its counterpart in the near field magnetic coupling antenna 1. In other words, the instant disclosure does not restrict the shapes of the radiators 11, as long as the radiators 11 are formed on a disk-shaped conductive plate.

Figure 2:
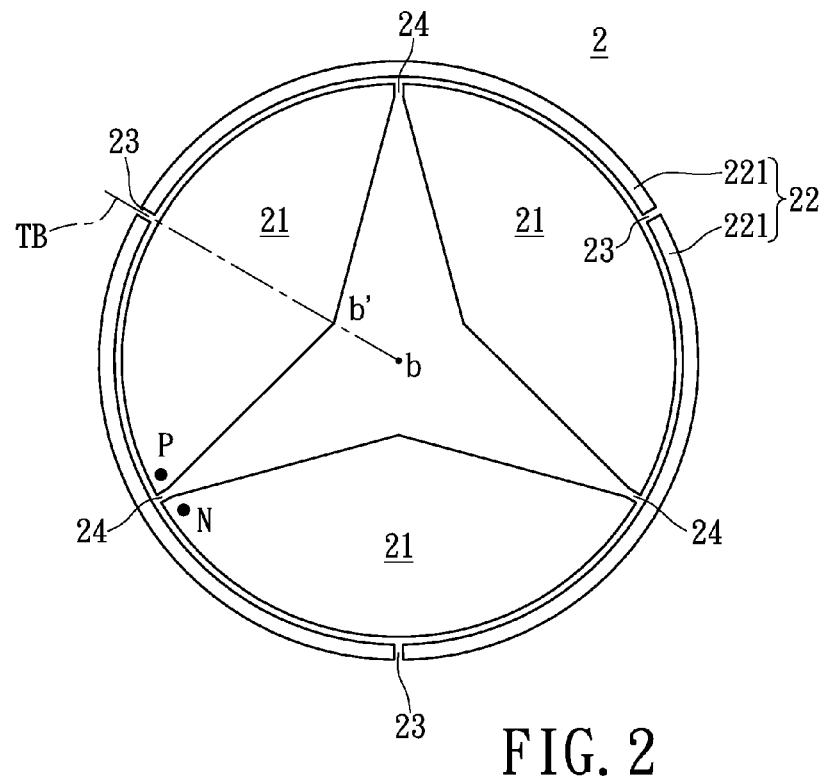
FIG. 2 shows a schematic diagram of a near field magnetic coupling antenna according to an embodiment of the instant disclosure.

FIG. 2 shows a schematic diagram of a near field magnetic coupling antenna according to an embodiment of the instant disclosure. The near field magnetic coupling antenna 2 may include three annularly arranged radiators 21 and an annular conductive portion 22. The annular conductive portion 22 may further include three conductive segments 221. The radiators 21 are formed on a disk-shaped conductive plate as well, with a star-shaped cavity defined by the placement of the radiators 21. Specifically, the three radiators 21 may be formed by having the disk-shaped conductive plate cut at three predetermined positions 24 serving as gaps between the adjacent radiators 21. The conductive segments 221 may be formed with a ring evenly divided by three equally-partitioned points, which may serve as gaps 23 between the annular conductive segments 221. Each of the conductive segments 221 of the annular conductive portion 22 may partially overlap the annularly arranged radiators 21, so that the annular conductive portion 22 may surround the radiators 21.

Each of the two adjacent radiators 21 may be associated with a feed point P and a ground point N, respectively, and the feed point P and the ground point N may be disposed in the proximity of the gap 24 between the two adjacent radiators 21. Each of the radiator 21 may be associated with a vertex "b'" facing the center "b" of the disk-shaped conductive plate. And each of equally-partitioned points may be in the horizontal alignment with b and b'. In other words, the equally-partitioned points for the annular conductive portion 22, b' and b may be on the same extension line TB.

Comparing to the near field magnetic coupling antenna 1 shown in FIG. 1A, the number of the radiators 21 of the near field magnetic coupling antenna 2 reduces from six to three. However, the radiators 21 are still rotational symmetric. In the following embodiments, the number of annularly arranged radiators varies from four to eight.

Figure 3:
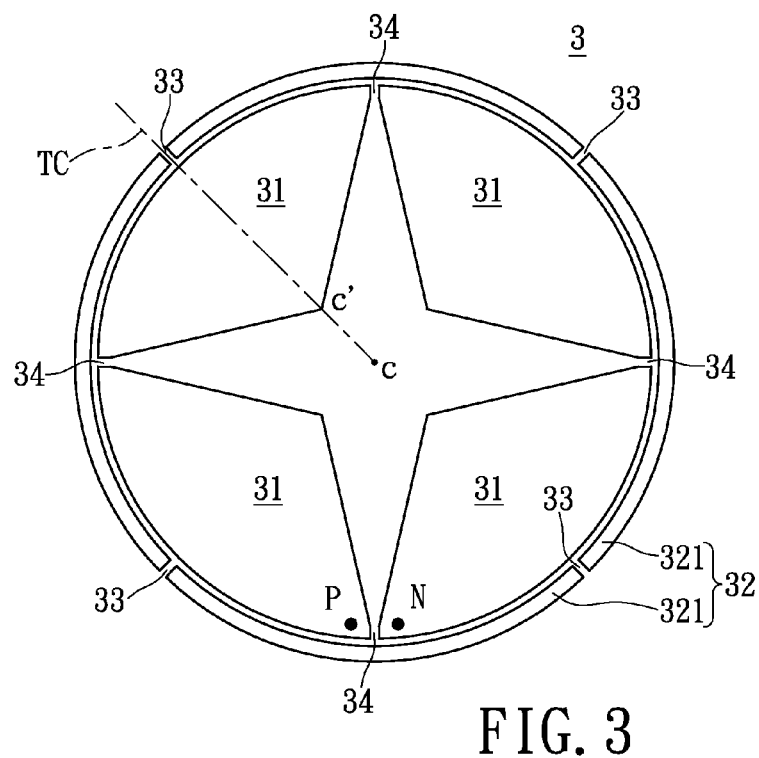
FIG. 3 shows a schematic diagram of a near field magnetic coupling antenna according to an embodiment of the instant disclosure.

FIG. 3 shows a schematic diagram of a near field magnetic coupling antenna according to an embodiment of the instant disclosure. The near field magnetic coupling antenna 3 may include four annularly arranged radiators 31 and an annular conductive portion 32. The annular conductive portion 32 may include four conductive segments 321. The radiators 31 are formed on a disk-shaped conductive plate and collectively define a star-shaped cavity, with a gap 34 formed between any two adjacent radiators 31. The conductive segments 321 may be formed with a ring evenly divided at four equally-partitioned points where gaps 33 formed between the two adjacent conductive segments 321. Similar to the embodiments illustrated in the above, the conductive segments 321 of the annular conductive portion 32 may partially overlap the annularly arranged radiators 31, so that the annular conductive portion 32 may surround the radiators 31. Each of the two adjacent radiators 31 may be associated with a feed point P and a ground point N, respectively, and the feed point P and the ground point N may be disposed in the proximity of the gap 34 between the two adjacent radiators 31. Each of the radiator 31 has a vertex "c'" facing the center "c" of the disk-shaped conductive plate and each equally-partitioned point (i.e., where the gap 33 is) may be in the horizontal alignment with c' and c or the equally-partitioned point, c' and c are on the same extension line TC.

Figure 4:
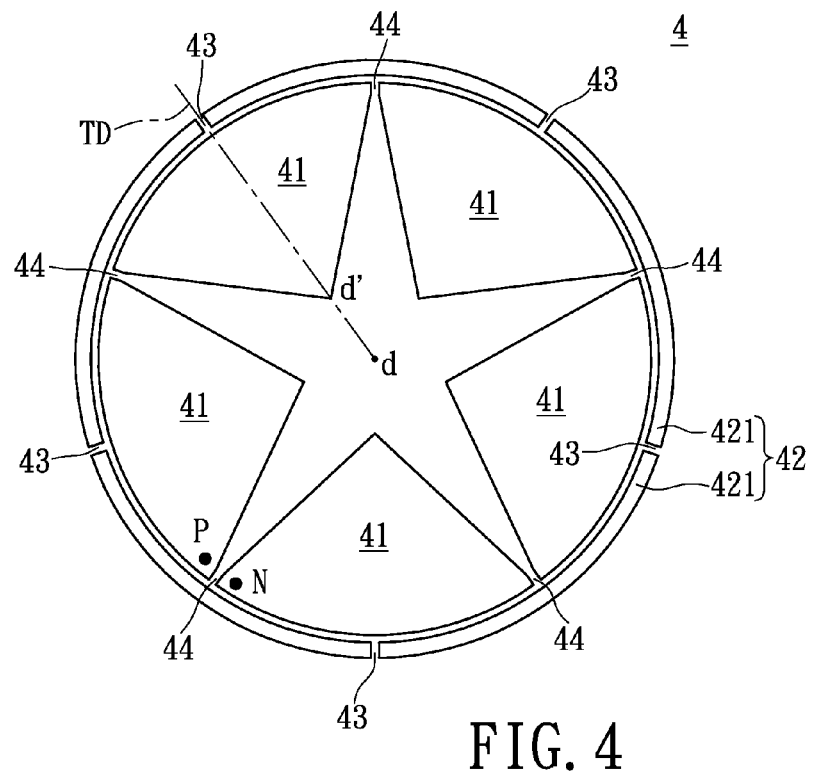
FIG. 4 shows a schematic diagram of a near field magnetic coupling antenna according to an embodiment of the instant disclosure.

FIG. 4 shows a schematic diagram of a near field magnetic coupling antenna according to an embodiment of the instant disclosure. The near field magnetic coupling antenna 4 may include five annularly arranged radiators 41 and an annular conductive portion 42. The annular conductive portion 42 may include five conductive segments 421. The radiators 41 may be formed on a disk-shaped conductive plate and collectively define a star-shaped cavity where no radiators 41 are formed, with a gap 44 formed between any two of the adjacent radiators 41. The conductive segments 421 may be formed with a ring evenly divided at five equally-partitioned points where gaps 43 are formed between the conductive segments 421. The annular conductive portion 42 may surround the annularly arranged radiators 41. Each of the two adjacent radiators 41 may be associated with a feed point P and a ground point N, respectively, and the feed point P and the ground point N may be disposed in the proximity of the gap 44 between the two adjacent radiators 41. Each of the radiator 41 has a vertex "d'" facing the center "d" of the disk-shaped conductive plate, and each equally-partitioned point (i.e., where the gap 43 is) is in the horizontal alignment with d and d'. In other words, the equally-partitioned point, d' and d are on the same extension line TD.

Figure 5:
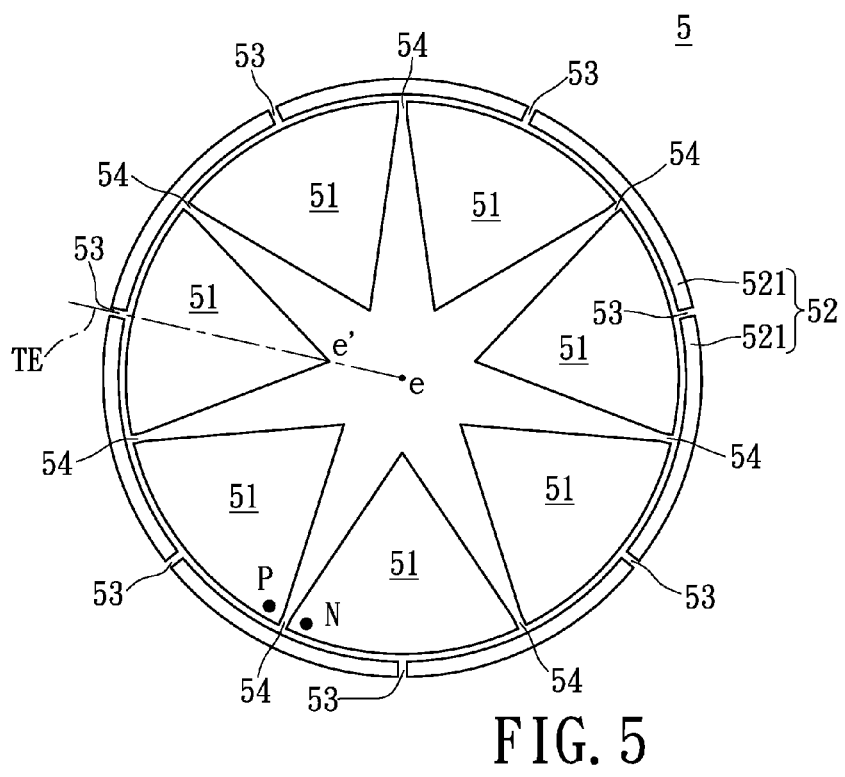
FIG. 5 shows a schematic diagram of a near field magnetic coupling antenna according to an embodiment of the instant disclosure.

FIG. 5 shows a schematic diagram of a near field magnetic coupling antenna according to an embodiment of the instant disclosure. The near field magnetic coupling antenna 5 may include seven annularly arranged radiators 51 and an annular conductive portion 52. The annular conductive portion 52 may include seven corresponding conductive segments 521. The radiators 51 may be formed on a disk-shaped conductive plate, and gaps 54 are formed between any two adjacent radiators 51. The conductive segments 521 may be formed with a ring evenly divided at the seven equally-partitioned points (i.e., where gaps 53 are formed. The annular conductive portion 52 may surround the annularly arranged radiators 51. Each of the two adjacent radiators 51 may be associated with a feed point P and a ground point N, respectively, and the feed point P and the ground point N may be disposed in the proximity of the gap 54. Each of the radiator 51 has a vertex "e'" facing the center "e" of the disk-shaped conductive plate. And similar to the embodiments discussed in the above, the gaps 53 between the conductive segments 521, e' and e may be on the same extension line TE. In short, the gap 53, e' and e may be in the horizontal alignment with respect to each other.

Figure 6:
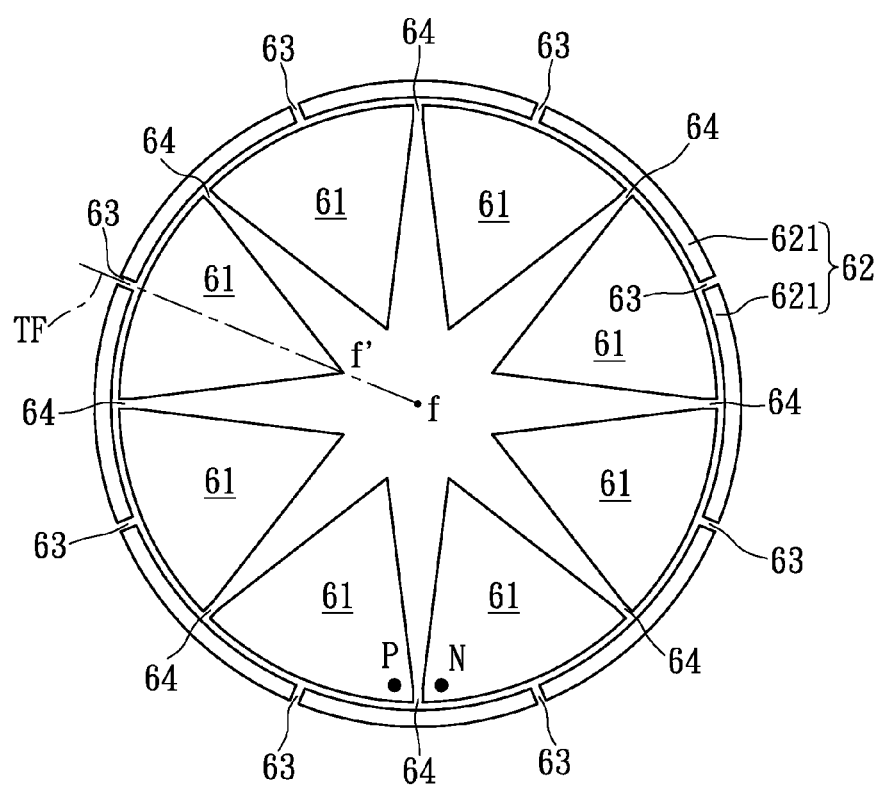
FIG. 6 shows a schematic diagram of a near field magnetic coupling antenna according to an embodiment of the instant disclosure.

FIG. 6 shows a schematic diagram of a near field magnetic coupling antenna according to an embodiment of the instant disclosure. The near field magnetic coupling antenna 6 may include eight annularly arranged radiators 61 and an annular conductive portion 62. The annular conductive portion 62 may include eight conductive segments 621 corresponding to the eight annularly arranged radiators 61. The radiators 61 may be formed on a disk-shaped conductive plate, with gaps 64 formed between any two of the adjacent radiators 61. The conductive segments 621 may be formed with a ring evenly divided at seven equally-partitioned points (where gaps 63 are formed). The annular conductive portion 62 may surround the annularly arranged radiators 61. Each of the two adjacent radiators 61 may be associated with a feed point P and a ground point N, respectively, and the feed point P and the ground point N may be disposed in the proximity of the gap 64 between the two adjacent radiators 61. Each of the radiator 61 may be associated with a vertex "f'" facing the center "f" of the disk-shaped conductive plate, each of the equally-partitioned points (i.e., where gaps 63 are formed) is at the same extension line TF along with f' and f.

Summing up the above embodiments, the number of the radiators and the number of the conductive segments of the near field magnetic coupling antenna are the same, with the number equal to or larger than three. The radiators may be annularly arranged, and the shape of the radiators is not restricted to the shape shown in the above embodiments.

Figure 7:
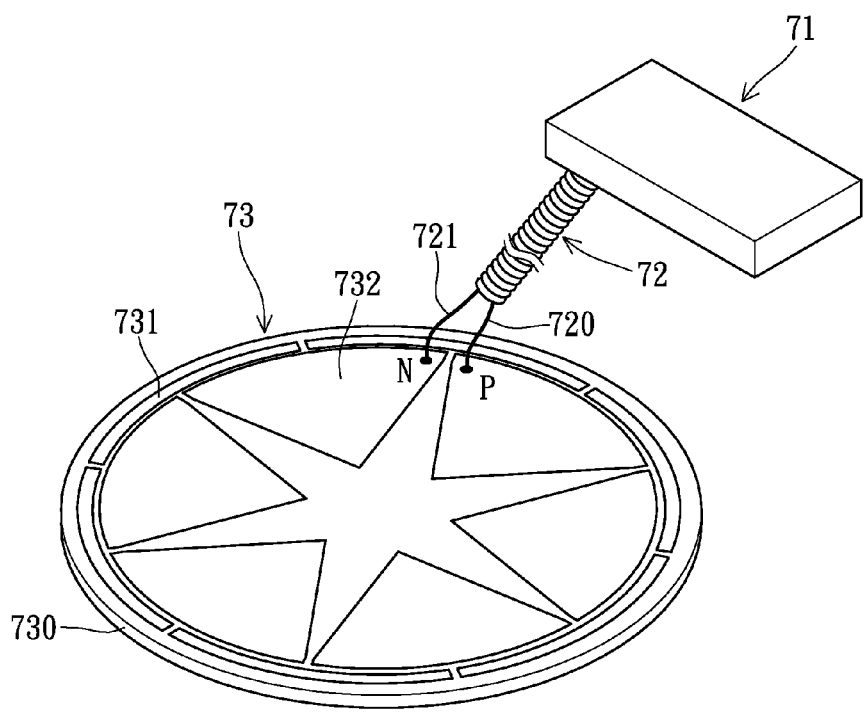
FIG. 7 shows a schematic diagram of a radio frequency identification reader according to an embodiment of the instant disclosure.

Please refer to FIG. 1A and FIG. 7, FIG. 7 shows a schematic diagram of a radio frequency identification reader according to an embodiment of the instant disclosure. The RFID reader 7 may include a RFID chip 71, a coaxial cable 72 and a near field magnetic coupling antenna 73. The coaxial cable 72 may include an inner conductor 720 and a ground conductor 721. The near field magnetic coupling antenna 73 may include radiators 731, an annular conductive portion 732 and a substrate 730. The near field magnetic coupling antenna 73 may be the near field magnetic coupling antenna 1 shown in FIG. 1A.

The coaxial cable 72 may be coupled to the RFID chip 71. The feed point P of the near field magnetic coupling antenna 73 may be for electrically coupling the inner conductor 720 of the coaxial cable 72, and the ground point N may be for electrically coupling the ground conductor 721 of the coaxial cable 72. The radiators 732 and the annular conductive portion 731 of the near field magnetic coupling antenna may be disposed on the substrate 730. The pattern of the radiators 732 and the annular conductive portion 731 may be made on the substrate 730 through an etching process.

The RFID reader 7 may transmit a RF signal to the near field magnetic coupling antenna 73 through the coaxial cable 72 and receive the RF signal from the near field magnetic coupling antenna 73 through the coaxial cable 72. The RFID reader 7 may be utilized to access the identification information of the RFID tags. An artisan of ordinary skill in the art will appreciate the operation of the RFID chip 71, thus there is no need to go into details.

Accordingly, the near field magnetic coupling antenna and the RFID reader of the aforementioned embodiments have resonant frequency and bandwidth adapted for radio frequency identification. The large area of the radiators of the near field magnetic coupling antenna increases the area of the surface current and the gaps between adjacent radiators are for coupling the energy of the UHF signal. The arrangement of the radiators and the annular conductive portion may enable a more-uniform near-field magnetic field, and the annular conductive portion enhances the magnitude of the near-field magnetic field.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A near field magnetic coupling antenna, comprising:
   a plurality of annularly arranged radiators, with a first gap formed between any two adjacent radiators; and
   an annular conductive portion, having a plurality of annular conductive segments, each annular conductive segment partially overlapping two adjacent radiators, with a second gap formed between the two adjacent annular conductive segments and the annular conductive portion surrounding the radiators;
   wherein the two adjacent radiators are associated with a feed point and a ground point, and the feed point and the ground point are defined in the neighborhood of the first gap between the two adjacent radiators;
   wherein the number of the annular conductive segments is equal to the number of the radiators;
   wherein the radiators are arranged in a predetermined manner so that a star-shape cavity where no radiators are present is defined;
   wherein the radiators are formed by having a disk-shaped conductive plate evenly partitioned at a plurality of predetermined positions so as to define the star-shaped cavity, with the predetermined positions serving as vertices of the star-shaped cavity, and the annular conductive segments are evenly partitioned at a plurality of equally-partitioned points, with the number of the equally-partitioned points equal to the number of the vertices of the star-shape cavity.

2. The near field magnetic coupling antenna according to claim 1, wherein the feed point and the ground point are for feeding a UHF (Ultra High Frequency) signal.

3. The near field magnetic coupling antenna according to claim 1, wherein the equally-partitioned point is located at a predetermined position in horizontal alignment with a center of the disk-shaped conductive plate and a vertex of the radiator.

4. The near field magnetic coupling antenna according to claim 1, wherein the width of first gap between any two adjacent radiators ranges from 1 mm to 5 mm.

5. The near field magnetic coupling antenna according to claim 1, wherein the number of the vertices of the star-shaped cavity is more than three.

6. The near field magnetic coupling antenna according to claim 1, wherein the diameter of the annular conductive portion ranges from 170 mm to 180 mm, the distance between the annular conductive segments of the annular conductive portion and the radiators ranges from 1 mm to 5 mm.

7. The near field magnetic coupling antenna according to claim 1, wherein the distance between any two adjacent annular conductive segments of the annular conductive portion ranges from 1 mm to 5 mm.

8. The near field magnetic coupling antenna according to claim 1, further comprising:
   a substrate, wherein the radiators and the annular conductive portion are disposed on the substrate.

9. The near field magnetic coupling antenna according to claim 1, wherein the annular conductive segments are magnetically coupled to the adjacent radiators to generate magnetic fields in transverse distribution for causing the near field magnetic coupling antenna to receive signals from a RFID tag notwithstanding whether the RFID tag is parallel or perpendicular to the near field magnetic coupling antenna.

10. A RFID (radio frequency identification) reader, comprising:
    a RFID chip;
    a coaxial cable, having an inner conductor and a ground conductor, coupling to the RFID chip; and
    a near field magnetic coupling antenna, comprising:
    a plurality of annularly arranged radiators, with a first gap formed between any two of the adjacent radiators; and
    an annular conductive portion, having a plurality of annular conductive segments, each of the conductive segments partially overlapping two of the adjacent radiators, with a second gap formed between the two of the adjacent conductive segments and the annular conductive portion surrounding the radiators;
    wherein the two adjacent radiators are associated with a feed point and a ground point, the feed point and the ground point are defined in the neighborhood of the first gap, the feed point is coupled to the inner conductor of the coaxial cable, and the ground point is coupled to the ground conductor of the coaxial cable;
    wherein the number of the annular conductive segments is equal to the number of the radiators;
    wherein the radiators are arranged in a predetermined manner so that a star-shaped cavity where no radiators are present therein is defined;
    wherein the radiators are formed by having a disk-shaped conductive plate evenly partitioned at predetermined positions, with the predetermined positions serving as vertices of the star-shaped cavity, and the annular conductive segments is formed by having the annular conductive portion evenly partitioned at a plurality of equally-partitioned points, with the number of the equally-partitioned points is equal to the number of the vertices of the star-shaped cavity.

11. The radio frequency identification reader according to claim 10, wherein the feed point and the ground point is for feeding a UHF (Ultra High Frequency) signal.

12. The radio frequency identification reader according to claim 10, wherein the equally-partitioned point is located at a predetermined position in horizontal alignment with a center of the disk-shaped conductive plate and a vertex of the radiator.

13. The radio frequency identification reader according to claim 10, wherein the number of the vertices of the star-shaped cavity is more than three.

14. The radio frequency identification reader according to claim 10, wherein the annular conductive segments are magnetically coupled to the adjacent radiators to generate magnetic fields in transverse distribution for causing the near field magnetic coupling antenna to receive signals from a RFID tag notwithstanding whether the RFID tag is parallel or perpendicular to the near field magnetic coupling antenna.

* * * * *